United States Patent
Van Zwet et al.

(10) Patent No.: US 11,343,001 B2
(45) Date of Patent: May 24, 2022

(54) PHOTON EXCHANGE BASED QUANTUM NETWORK AND METHOD OF OPERATING SUCH A NETWORK

(71) Applicants: Nederlandse Organisatie voor toegepast-natuurwetenschappelijk onderzoek TNO, 's-Gravenhage (NL); Technische Universiteit Delft, Delft (NL)

(72) Inventors: Erwin John Van Zwet, Pijnacker (NL); Ronald Hanson, Delft (NL); Peter Conway Humphreys, Delft (NL); Norbert Kalb, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/299,882

(22) PCT Filed: Dec. 5, 2019

(86) PCT No.: PCT/NL2019/050810
§ 371 (c)(1),
(2) Date: Jun. 4, 2021

(87) PCT Pub. No.: WO2020/117061
PCT Pub. Date: Jun. 11, 2020

(65) Prior Publication Data
US 2022/0029710 A1    Jan. 27, 2022

(30) Foreign Application Priority Data
Dec. 5, 2018 (EP) .................................... 18210480

(51) Int. Cl.
*H04B 10/70* (2013.01)
*H04B 10/61* (2013.01)
*H04B 10/548* (2013.01)

(52) U.S. Cl.
CPC ........... *H04B 10/70* (2013.01); *H04B 10/548* (2013.01); *H04B 10/61* (2013.01)

(58) Field of Classification Search
CPC ....... H04B 10/548; H04B 10/61; H04B 10/70
See application file for complete search history.

(56) References Cited

U.S. PATENT DOCUMENTS

2005/0078827 A1* 4/2005 Tajima ................. H04L 9/0858
380/256
2007/0116286 A1   5/2007 Yuan et al.
(Continued)

FOREIGN PATENT DOCUMENTS

EP          1499040 A2      1/2005

OTHER PUBLICATIONS

Hensen et al., Experimental loophole-free violation of a Bell inequality using entangled electron spins separated by 1.3 km (and Supplementary Information), Nature vol. 526, pp. 682-686 (Oct. 29, 2015).

(Continued)

*Primary Examiner* — Nathan M Cors
(74) *Attorney, Agent, or Firm* — Leydig, Voit & Mayer, Ltd.

(57) ABSTRACT

Quantum network nodes use light from a laser to stimulate emission of single photons. A detection station detects arrival of the photons from the quantum network nodes at a photon arrival detector. In time slots between single photon emissions, the quantum network node supply light from the laser to the detection station. The detection station measures a phase differences between light from a reference laser and (Continued)

the light received from different quantum network nodes in said time slots. The detection station has optical phase and/or frequency modulators between the optical inputs for light from the quantum network nodes and the photon arrival detector. The detection station uses the measured phase differences in control loops to control the phase or frequency modulator to adjust modulation dependent on the phase difference, so as to establish a predetermined phase relation between the reference laser and the light obtained by modulating the received light from the quantum network nodes in the detection station. The control signal is maintained during the expected time of arrival of photons emitted by the quantum network nodes.

15 Claims, 6 Drawing Sheets

(56) References Cited

U.S. PATENT DOCUMENTS

| | | |
|---|---|---|
| 2012/0328290 A1 | 12/2012 | Yuan et al. |
| 2016/0234018 A1* | 8/2016 | Frohlich ............... H04L 9/0852 |
| 2020/0044750 A1* | 2/2020 | Cai ..................... H01S 5/06216 |
| 2020/0304300 A1* | 9/2020 | Rhee .................... H04L 9/0825 |

OTHER PUBLICATIONS

Humphreys et al., Deterministic delivery of remote entanglement on a quantum network, Nature 558, pp. 268-273 (Jan. 15, 2018).
European Patent Office, International Search Report in corresponding International Application No. PCT/NL2019/050810, dated Mar. 6, 2020 (3 pages).

* cited by examiner

PHOTON EXCHANGE BASED QUANTUM NETWORK AND METHOD OF OPERATING SUCH A NETWORK

CROSS-REFERENCE TO RELATED APPLICATIONS

This patent application is a U.S. National Phase of PCT International Application No. PCT/NL2019/050810, filed Dec. 5, 2019, which claims priority to European Application No. 18210480.2, filed Dec. 5, 2018, which are both expressly incorporated by reference in their entireties, including any references contained therein.

FIELD OF THE INVENTION

The invention relates to a photon exchange based quantum network.

BACKGROUND

A photon exchange based quantum network is described in an article by P. C. Humphreys et al. titled "Deterministic delivery of remote entanglement on a quantum network use quantum entangled states", published in Nature 558, 268-273 (2018).

As known per se, quantum networks can be used to secure communication and to perform quantum computing. A quantum network contains a plurality of physical sub-systems, referred to as quantum network nodes. In a photon exchange based quantum network physical sub-systems are used wherein each physical subsystem has the ability to emit single photons that are entangled with an internal degree of freedom of the physical sub-system. In known photon exchange based quantum networks nitrogen vacancy centers (NV centers) in diamonds, trapped atomic systems (for example cesium or calcium atoms in a cavity) or quantum dots may be used in physical subsystems.

Furthermore, the photon exchange based quantum network comprises a detection station, the quantum network nodes being coupled to the detection station via an optical path, such as an optical fiber or free space through the air. In an embodiment, a single detection station may be used for a set of quantum network nodes, to act as a central node, but more than one detection station may be used, that can be at the same location as a node.

A key step for the implementation of quantum networks is the generation of entanglement, i.e. the operation procedure that provides that in its quantum mechanical description the state function of a combination of at least two of the physical subsystems cannot be expressed as a product of state functions of the individual physical subsystems. Instead the state function of the combination may be a sum of different products of state functions of the individual physical subsystems multiplied by different coefficients.

In a photon exchange based quantum network the entanglement across the network is generated by using a detection station to detect photons emitted by different network nodes. To entangle two physical subsystems a detector is used that provides for detection of individual photons from both physical subsystems indiscriminately in the detection station. In the quantum mechanical description, photon emission is associated with only part of the states of an individual physical subsystem (node). A preparation procedure is used that ensures that, at least with high likelihood, the state function of the individual physical subsystems in the quantum mechanical description is a coherent mixture of states with and without associated photon emission ability. At this point the individual physical subsystems are not entangled. Subsequent to the preparation of the system a light pulse is applied to each of the individual physical subsystems to stimulate the emission of a photon, dependent on the state of the subsystem.

Detection of a photon in the detection station can, under suitable conditions, herald that entanglement has been achieved. However, the reverse is not true: absence of detection of any photon can be due to absence of emission or another source of failure, such as photon loss during transmission. A major challenge for photon exchange based quantum networks is that the probability of detection of photons associated with the quantum network nodes is small (e.g. of the order of 0.001). Many photons are lost in optical collection and in the transmission path, for example in an optical fiber coupling the nodes to the detector. Physical subsystems like NV centers, or another type of trapped atoms like for example based on cesium and calcium, e.g. comprising an atom trapped in a cavity, produce photon states corresponding to wavelengths outside the optimal band used for optical fiber communication, which increases loss when the physical subsystems are far apart.

Humphreys et al. use an excitation laser outside the quantum nodes and optically splitted the light in order to get parallel pulses from the excitation laser to the quantum network nodes via optical fibers. At the quantum network nodes these pulses provide for emission of photons from the nodes, which are collected and travel to the detection station. At the detection station, these photons are detected by the single photon detectors.

To be able to make use of entanglement, a stable phase relation between the states is needed. In the case of Humphreys et al. this requires a stable difference between the cumulative optical phase delays from the optical splitting of the light, to the quantum network nodes and all the way up to the detection station. Humphreys et al use a fiber stretcher in the optical path from one of the quantum network nodes to compensate for, relatively slow, phase variations. The optical phase delay of the fiber stretcher is adjusted using feedback control of the phase compensation during time slots of a time multiplexing scheme, that has further time slots for transmission of photons from the NV centers.

Humphreys et al. refer to an article by Hensen et al., titled "Experimental loophole-free violation of a Bell inequality using entangled electron spins separated by 1.3 km" published in Nature, volume 526, pages 682-686 (29 Oct. 2015). Hensen et al. disclose a scheme with local excitation lasers at the quantum nodes, instead of the excitation laser at the detection station. Hensen et al. use a scheme to achieve entanglement that requires that the local lasers imprint the same phase difference in successive time bins, i.e. over two hundred nano seconds. To accomplish this, Hensen et al. (supplement) use a feedback loop to control the wavelength of the laser of a first node, based on a frequency comparison with light from the laser of a second node that is transmitted directly between the nodes.

US20120328290 discloses a quantum communication system with a receiver and a plurality of transmitters and its use in secure key distribution. Each transmitter comprises an interferometer with an optical phase modulator in one arm. The interferometer is used to pass polarized pulses from a laser diode to a polarization maintaining fiber. The system provides for a feedback signal from the receiver to the transmitter to control an arm length in the interferometer. The polarization is adjusted to minimize reduction of the count rate due to polarization drift. Similarly, the tuning of the trigger time of the laser diode is adjusted to minimize the effect of photo arrival time drift based on detection results.

US20160234018 discloses a quantum communication system with a plurality of transmitters for realizing quantum channels in combination with transmitters for classical channels.

SUMMARY

Among others it is an object to provide a photon exchange based quantum network with relatively high photon loss.

A method of operating a photon exchange based quantum network according to claim 1 is provided. In both a first and second quantum network node, a pulse of light from the laser of the node to a sub-system like an NV center, a trapped atomic system, or a quantum dot, in the node. A light transmission path, which may comprise an optical fiber or a free space path, is provided from each node to a detection station, for passing a photon from the sub-system. Light from the laser of the node is also supplied into the light transmission path in a time slot preceding a time point at which the network node supplies the pulse of light from the laser of the node. In the detection station a photon arrival detector detects the times of arrival of photons from the light transmission path. Furthermore, optical phase and/or frequency modulator(s) between a photon arrival detector and the respective light transmission paths, are used to adapt the optical phase and/or frequency transmission of light from the light transmission paths, so as to establish predetermined phase relations between a reference laser and light from the light transmission paths in the time slots. The adapted optical phase and/or frequency transmission is maintained during observation time slots at which photons from the sub-systems arrive. Thus synchronization of the light supplied from the different quantum network nodes at the photon arrival detector can be maintained without requiring additional transmission paths, even if long transmission paths such as optical fibers or free space connections to and from a satellite are used.

In an embodiment, optical frequency converters are used in the quantum network nodes, between the NV center and laser on one hand and the transmission path to the detection station on the other hand. This makes it possible to use standard optical communication fibers in the transmission paths between the quantum network nodes and the detection station, which reduces photon loss, compared to use of fibers operating at optical frequencies of photons produced by the sub-systems. Typically, frequency conversion involves pumping with an additional laser. By using optical phase and/or frequency modulators in the detection station to control the phase, no additional measures are needed to compensate for instability introduced by such additional lasers.

BRIEF DESCRIPTION OF THE DRAWING

These and other objects and advantageous aspects will become apparent from a description of exemplary embodiments with reference to the following figures.

DETAILED DESCRIPTION OF EXEMPLARY EMBODIMENTS

Figure 1:
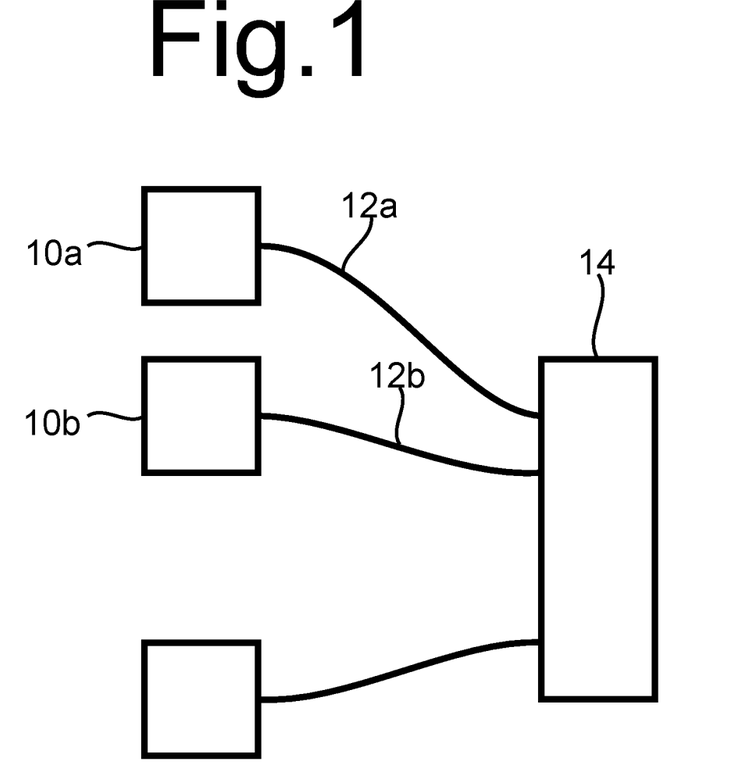
FIG. 1 shows a photon exchange based quantum network

FIG. 1 shows a photon exchange based quantum network comprising quantum network nodes 10a,b, optical fibers 12a,b and a detection station 14 coupled to quantum network nodes 10a,b via optical fibers 12a,b. Although only two quantum network nodes 10a,b are labeled and three are shown, many more may be present. Quantum network nodes 10a, may all have a similar design. But alternatively, quantum network nodes 10a based on different technologies may be used. Although an embodiment with a single detection station 14 is shown, it should be appreciated that the network may comprise more than one detection station 14, e.g. for different groups of quantum network nodes 10a. The detection station 14 can also be physically located at the same location as one of the network nodes 10a,b.

Figure 2:
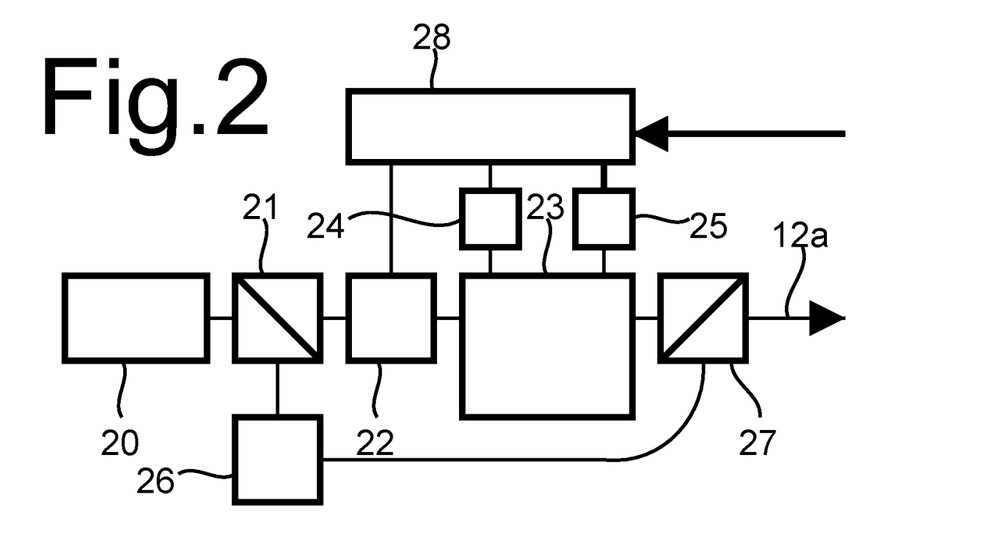
FIG. 2 shows a quantum network node

FIG. 2 shows a quantum network node, comprising a laser 20 (which may also be referred to as the excitation laser), an optical splitter 21, an optical pulse modulator 22, a carrier 23 that contains the sub-system to be entangled, a state driver 24, a sensor system 25, an optical shutter 26, an optical combiner 27 and a control circuit 28.

In an embodiment, carrier 23 comprises a diamond, and the sub-system to be entangled may be an individual NV center in the diamond. Such carriers are known per se e.g. from Humphreys et al. and Hensen et al. As described there, an NV center is an example of a quantum system with a limited number of electron spin states. The quantum network node may comprise further components (not shown) such as a magnet and electric field electrodes to apply magnetic and or electric fields to the NV center, and/or additional laser sources to control the charge state. Quantum network node may comprise a cryostat bath, or closed cycle cooler, to cool carrier 23.

An output of laser 20 is coupled to carrier 23 via optical splitter 21 and optical pulse modulator 22. Although the figure shows lines to represent the coupling, but any medium such as free space or optical fibers could be used. A microscope or lenses (not shown) may be used to direct light from laser 20 to the sub-system to be entangled, e.g. to an individual NV center. In the illustrated embodiment, the wavelength of laser 20 preferably matches that of the NV center (e.g. 637 nm). Carrier 23 is coupled to a first input of optical combiner 27 to allow carrier 23 to supply light to combiner 27 from the sub-system to be entangled. A microscope or lenses (not shown) may be used to collect light from the sub-system to be entangled to the first input of optical combiner 27. An output of optical combiner 27 is coupled to optical fiber 12a. In parallel, laser 20 is coupled to a second input of optical combiner 27 via optical splitter 21 and optical shutter 26.

Control circuit 28 may comprise a computer programmed with a program of instructions to control operation of quantum network node. Control circuit 28 is coupled to pulse modulator 22 and optical shutter 26 (connection to the latter not shown in the figure). Control circuit 28 may have an input for receiving commands or synchronization signals from detection station 14. Control circuit 28 is also coupled to state driver 24 and sensor system 25. State driver 24 and sensor system 25 are coupled to carrier 23. State driver 24 is configured to bring the sub-system to be entangled into a desired initial state. State driver 24 may comprise an optical source for applying light to the NV center to make it likely that the NV center is in a predetermined first state and a microwave source and a microwave pulse generation system coupled to electrodes on carrier 23 that drives the first state of the NV center to a state that is a superposition of the first state and a second state. Sensor system 25 is configured to apply a measurement operation in the entangled sub-system.

The basic operation involving the NV center is known per se. Control circuit 28 controls state driver 24 to prepare the state of the NV center as described in Humphreys et al. and Hensen et al. A procedure is used that ensures that, at least with high likelihood, the quantum state of the sub-system to be entangled, e.g. of the individual NV center, is a superposition of states |a> and |b> with and without associated photon emission ability. For example the NV center may be initialized by optical pumping and then driven to the state c1|a>+c2|b> by means of a microwave pulse (c1 and c2 are coefficients with the property |c1*c1|+|c2*c2|=1; c1 and c2 may be complex numbers). Next, at a predetermined clock time, control circuit 28 controls pulse modulator 22 to pass a pulse of light (referred to as the excitation pulse) from laser 20 to the sub-system to be entangled. In the quantum mechanical description, the light pulse is an operator which operates on the state |a> that is associated with photon emission capability to produce a combined state |a1>=|a>|1> that is a combination of the state |a> and a one photon state (function) in optical fiber 12a. The other state (function) |b> does not provide for photon emission and can be said to result in a state |b,0>=|b>|0> with zero emitted photons. Thus the overall state (function) is c1|a,1>+c2|b,0> Control circuit 28 may repeat the process by controlling pulse modulator 22 to pass a pulse of light from laser 20 to the NV center repeatedly at successive predetermined clock times, e.g. periodically, until it receives a command from detection station 14 to stop.

In addition to the basic operation of the device of FIG. 2, control circuit 28 controls optical shutter 26 to pass light from laser 20 to optical fiber 12a bypassing the NV center in reference time slots that lie between the predetermined clock times. The reference time slots need not extend over the entire time interval between the predetermined clock times.

Figure 3:
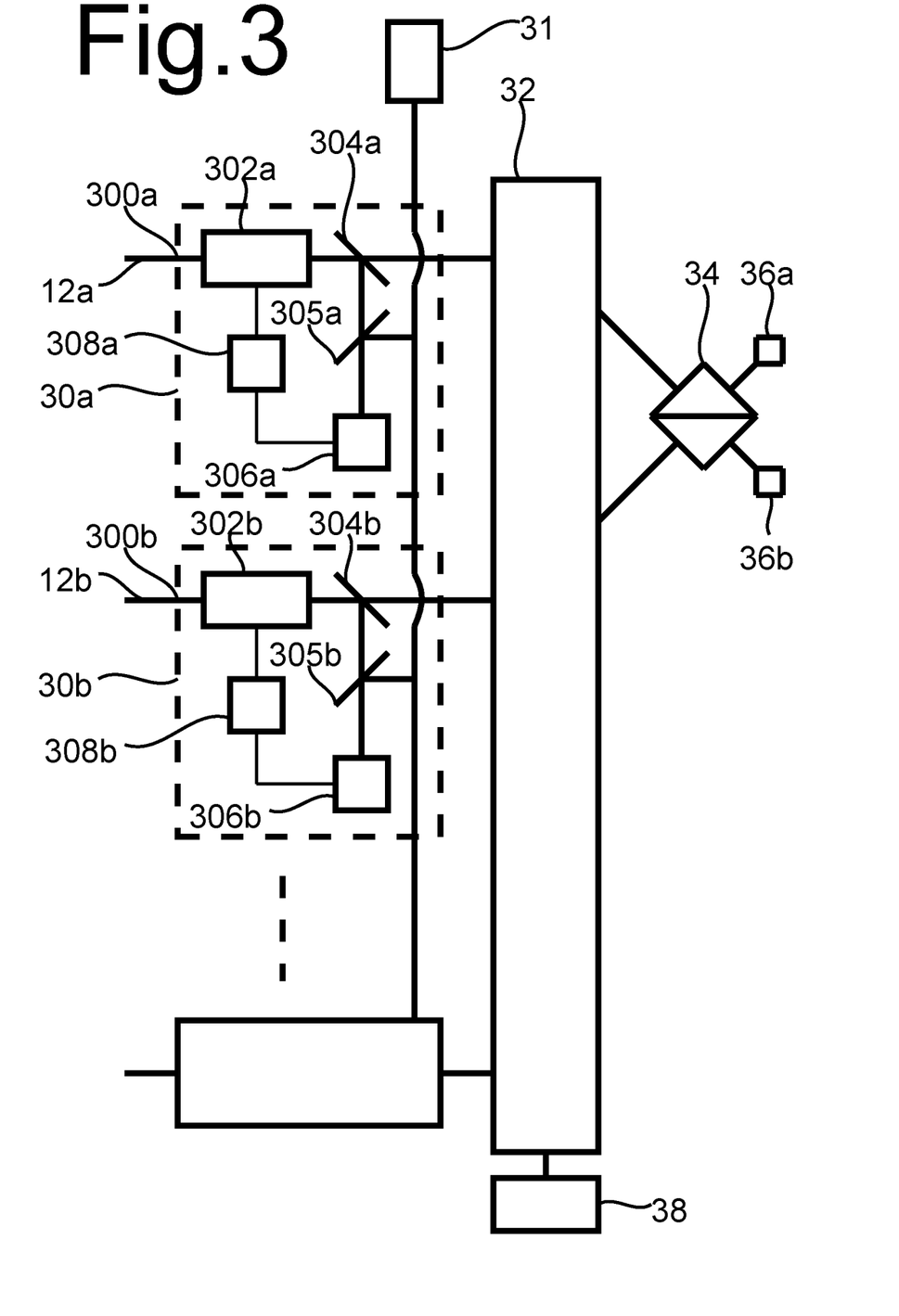
FIG. 3 shows a detection station of a photon exchange based quantum network

FIG. 3 shows a detection station comprising a reference laser 31, an optical switch 32, an optical splitter 34, first and second optical photon detectors 36a,b and a control circuit 38. Optical switch 32 has a plurality of optical inputs and at least a first and second optical output. Control circuit 38 is coupled to optical switch 32 for selecting a first and second one of the optical inputs which of the optical switch 32 will couple to the first and second optical output. The first and second optical output are coupled to respective inputs of optical splitter 34. Optical splitter 34 has first and second optical outputs coupled to first and second optical photon detectors 36a,b respectively. Detection outputs (not shown) of first and second optical photon detectors 36a,b are coupled to a data processing circuit, which may be part of control circuit 38 for example, or another processing circuit (not shown).

Furthermore, a plurality of units 30a,b can be distinguished in the detection station (only two shown in detail, but more may be used). The units 30a,b are coupled between the optical fibers 12a,b and from respective ones of the quantum network nodes (not shown) and optical switch 32. Optical inputs 300a,b of the units 30a,b for the optical fibers 12a,b are symbolically indicated. Each unit 30a,b will be said to correspond to the quantum network node coupled to the optical fiber 12a,b that is coupled to the unit 30a,b. Optical switch 32 serves to determine from which quantum network nodes light will be passed to the inputs of optical splitter 34.

Figure 3A:
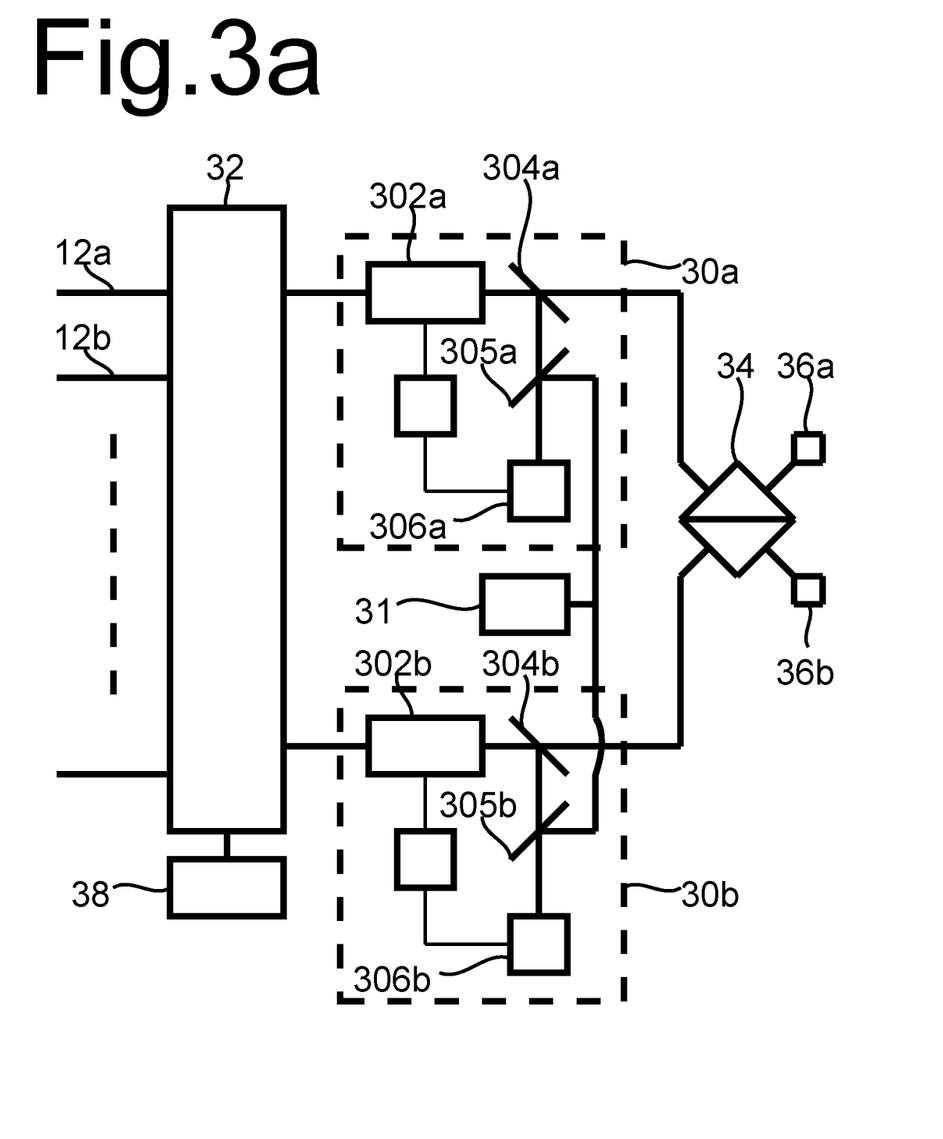
FIG. 3a shows an embodiment with switching before phase stabilization

FIG. 3a illustrates an embodiment wherein the optical switching needed to select from which quantum network node light is passed to optical splitter 34 is performed before the light passes through units 30a,b. In another embodiment (not shown) part of the optical switching needed to select from which quantum network node light is passed to optical splitter 34 is performed before the light passes through units 30a,b as in FIG. 3a, but with more than two units like 30a,b and part behind these units as in FIG. 3, to select a pair of units for use in detection. Performing part or all of the switching after units 30a,b, has the advantage that the feedback loops can be more stable, since they continue to receive light from the same quantum network node before and after switching. In this way the nodes can be continuously phase locked and the time needed to switch attention between different quantum network nodes can be reduced. An advantage of having units 30a,b after the switch is that optical phase variations taking place in the switch 32 will be automatically compensated for. Furthermore, performing part or all of the switching before units 30a,b as in FIG. 3a, has the advantage that fewer units 30a,b are required.

Each unit 30a,b comprises an acoustical optical modulator 302a,b (also referred to as acousto-optic modulator) and an optical splitter 304a,b, successively in series in an optical path between optical inputs 300a,b and a first and second of the inputs of optical switch 32. Optical splitter 304a,b is configured to split off a fraction of the light passed from acousto-optic modulator 302a to the input of optical switch 32. In another embodiment, acousto-optic modulator 302a may be located in the optical path before optical switch 32, as shown in FIG. 3 and optical splitter 304a,b may be located in the optical path behind optical switch 32.

Furthermore, each unit 30a,b in FIG. 3 comprises an optical combiner 305a,b, a detector 306a,b and an electronic feedback circuit 308a,b. Optical combiner 305a,b and detector 306a,b are used to form an optical phase detector in each unit 30a,b, for detecting signal indicative of a relative phase of light split off by optical splitter 304a,b and light from reference laser 31. The optical combiner 305a,b of each unit 30a,b may be configured to receive the light split off by optical splitter 304a,b of the unit 30a,b and the light from reference laser 31 and to output a combination of both. The detector 306a,b of the unit 30a,b may be configured to detect the intensity of the light output by optical combiner 305a,b of the unit 30a,b.

The electronic feedback circuit 308a,b of the unit 30a,b has an input coupled to an electronic output of the optical phase detector 306a,b of the unit 30a,b and an output coupled to a control input of the acousto-optic modulator 302a of the unit 30a,b. In an embodiment, electronic feedback circuit 308a comprises a differential amplifier, with inputs coupled to an output of detector 306a,b and a source of a reference value, controller with adjustable proportional gain, integrator and differentiator actions, and an output coupled to the control input of acousto-optic modulator 302a,b.

In operation optical combiner 305a,b, detector 306a,b and electronic feedback circuit 308a,b form a feedback loop for controlling the phase of light output by acousto-optic modulator 302a relative to that of the light from reference laser 31. The feedback loop is configured to operate as a feedback loop only during feedback time slots that correspond to the reference time slots of the quantum network node to which the unit 30a,b is coupled via the optical fiber 12a,b, so that light passed from the laser of quantum network node to the optical fiber 12a bypassing the NV center in the quantum network node is used in the feed back loop. Each unit 30a,b may comprise a control circuit (not shown) to control timing of the feedback time slots, or a shared control circuit like control circuit 38 may be used for this purpose. Electronic feedback circuit 308a,b may be configured to hold the feedback signal supplied to acousto-optic modulator 302a,b unchanged outside these feedback time slots, or at a constant rate of change equal to a rate of change obtained during the previous feedback time slot. The feedback loops have the effect that the wavelength (frequency) of light output from acousto-optic modulator 302a,b is changed to become the same as that of reference laser 31 and that the phase of light output from acousto-optic modulator 302a,b is changed to have a predetermined phase relative to reference laser 31 at least in the feedback time slots. This is so for all units 30a,b, and it is also true for light (photons) passed outside the feedback time slots.

Figure 3B:
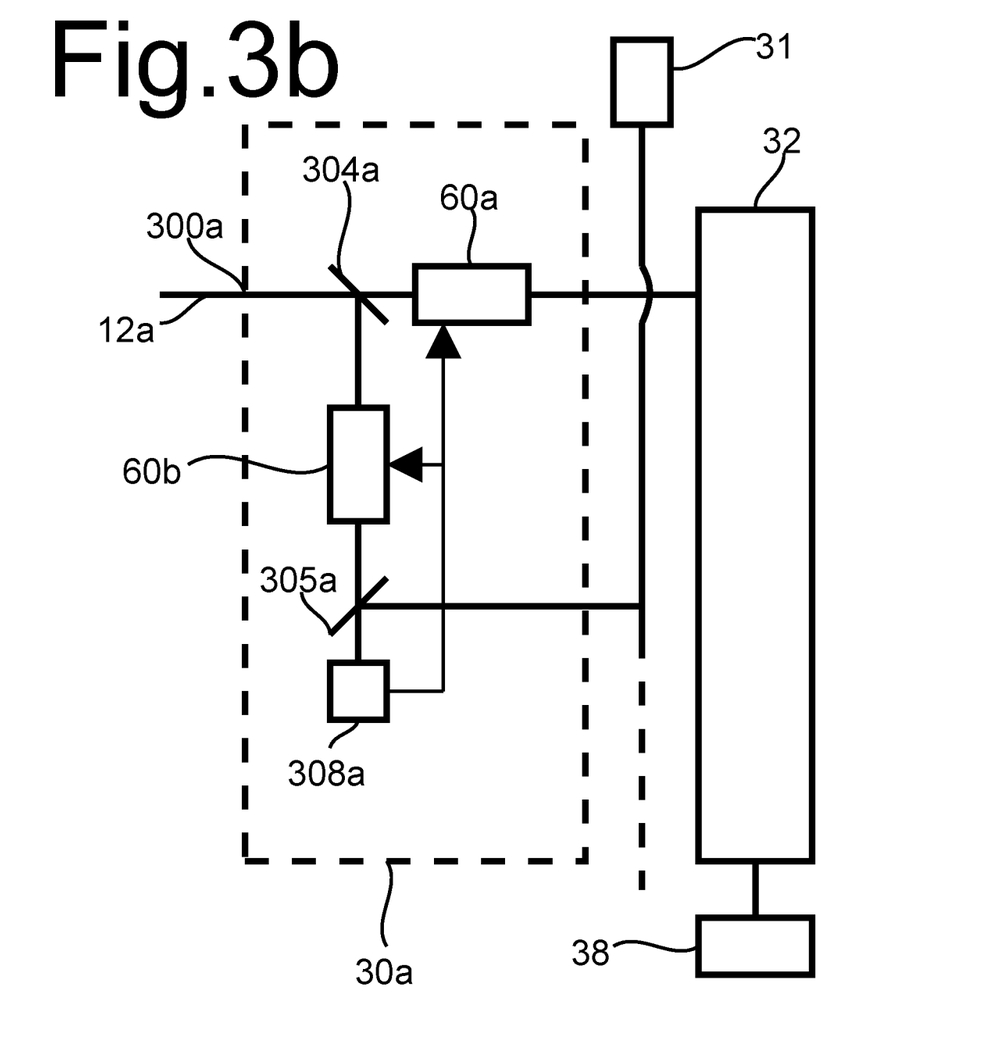
FIG. 3b shows an alternative reception unit

Although not shown, it may be noted that each unit 30a,b may comprise further feedback loops to control other properties of light transmission, such as polarization. Furthermore, it should be noted that, instead of the illustrated feedback loop, other control configurations with a similar function could be used. For example, as shown in FIG. 3b a first and second, identical acoustic optical modulator 60a,b could be used in a same unit 30a, with optical splitter 304a between these optical modulators and input 300a and the first acoustic optical modulator 60a coupled between the optical splitter 304a and the optical switch 32. In this embodiment, the second acoustic optical modulator 60b receives a fraction of the incoming light and the output of the second acoustic optical modulator may be coupled to optical combiner 305a instead of a first optical splitter 304a. The output of feedback circuit 308a may be coupled to both acoustic optical modulators 60a,b.

Control circuit 38 controls optical switch 32 to couple specified inputs of optical switch 32 to its outputs. Thus control circuit 38 indirectly specifies quantum network nodes corresponding to the units 30a,b coupled to the specified inputs of optical switch 32. Control circuit 38 controls optical switch 32 to couple the specified inputs of optical switch 32 to its outputs at least during observation time intervals that correspond to the times of transmission of the excitation pulses generated by the specified quantum network nodes, subject to compensation for transmission delay from the specified quantum network nodes. The observation time intervals lie outside the feedback time slots. The timing of the excitation pulses in the quantum network nodes is selected so as to make the observation time intervals for both quantum network nodes corresponding with the specified inputs coincide. Control circuit 38 may be configured to notify the specified quantum network nodes of the required timing of the excitation pulses for this purpose.

Optical splitter 34 (shown in FIGS. 3, 3a and also present in the other embodiments, although it is not shown all figures that illustrate aspects of the embodiments) is configured to pass light from each of the outputs of optical switch 32 to both first and second optical photon detectors 36a,b. Due to the quantum nature of photons, a photon emitted by a quantum network node will be detected at most by one of the optical photon detectors 36a,b. Thus it can be inferred that a photon detection is due to transmission from one of the quantum network nodes corresponding to the units 30a,b coupled to the specified inputs of optical switch 32, but not to which quantum network node. The data processing circuit coupled to first and second optical photon detectors 36a,b records the clock time of the detection of the photons.

In the quantum mechanical description of the system formed by the quantum network nodes, the detection of photons operates to entangle the quantum network nodes. Before detection, the state function is a product of state functions due to the individual quantum network nodes. Because each of units 30a,b contains a feedback loop the wavelength of all detected photons is the same and the photons from different quantum network nodes have a stable phase relation relative to each other. This enables the use of the entanglement. Neglecting the effect of photon propagation, the state function is a product of state functions $c1|a,1\rangle+c2|b,0\rangle$ and $c1'|a',1\rangle+c2'|b',0\rangle$ of the quantum network nodes. The overall system state that corresponds to a single photon detection event detection state $|d1\rangle$ of the detectors becomes $(c1*c2'|a\rangle|b'\rangle+c2*c1'|b\rangle|a'\rangle)$. In this case, the states of the two quantum network nodes are entangled. This may be used to obtain correlated measurements in the quantum network nodes. In an embodiment, the detection station may transmit photon detection results to the quantum network nodes, which may use them for selection of excitation pulses that have resulted in entanglement, and selection of measurement results obtained by applying measurement operations to the states obtained using the selected excitation pulses.

Of course the effect of photon propagation is not negligible, as it involves a high probability of photon loss and a probability of noise photon creation. This reduces the efficiency of the production of entanglement, but it need not affect the fact that part of the state is entangled. The effect of propagation from the quantum network node to the optical photon detector 36a,b affects the single photon detection operation at a optical photon detector 36a,b by mapping the state functions $|a,1\rangle$ of the individual quantum network nodes to a mix of states $|a, 1\rangle$ and $|a,0\rangle$ with and without photons. Photon detection entangles components of such mixed states. Photon loss typically has a larger impact, but the same applies to the effect of noise photon creation. Noise photon creation maps the original state $|b,0\rangle$ to a mix of states $|b, 1\rangle$ and $|b,0\rangle$ with and without photons.

To minimize photon loss, it is preferred to convert the wavelength of the photons in the quantum network nodes to a wavelength in the transmission band of optical fibers used for telecommunication (for example 1588 nanometer, that lies in the band from 1260 nanometers to 1625 nanometers) and to use such optical fibers for transmitting the converted photons from the quantum network nodes 10a,b to the detection station 14. For example, the wavelengths of photons emitted by NV centers (637 nanometer) and by calcium ions (854 nanometer), are both outside this band. By converting its wavelength to a wavelength in the (1260 to 1625 nanometer band), fiber photon loss can be reduced.

Figure 4:
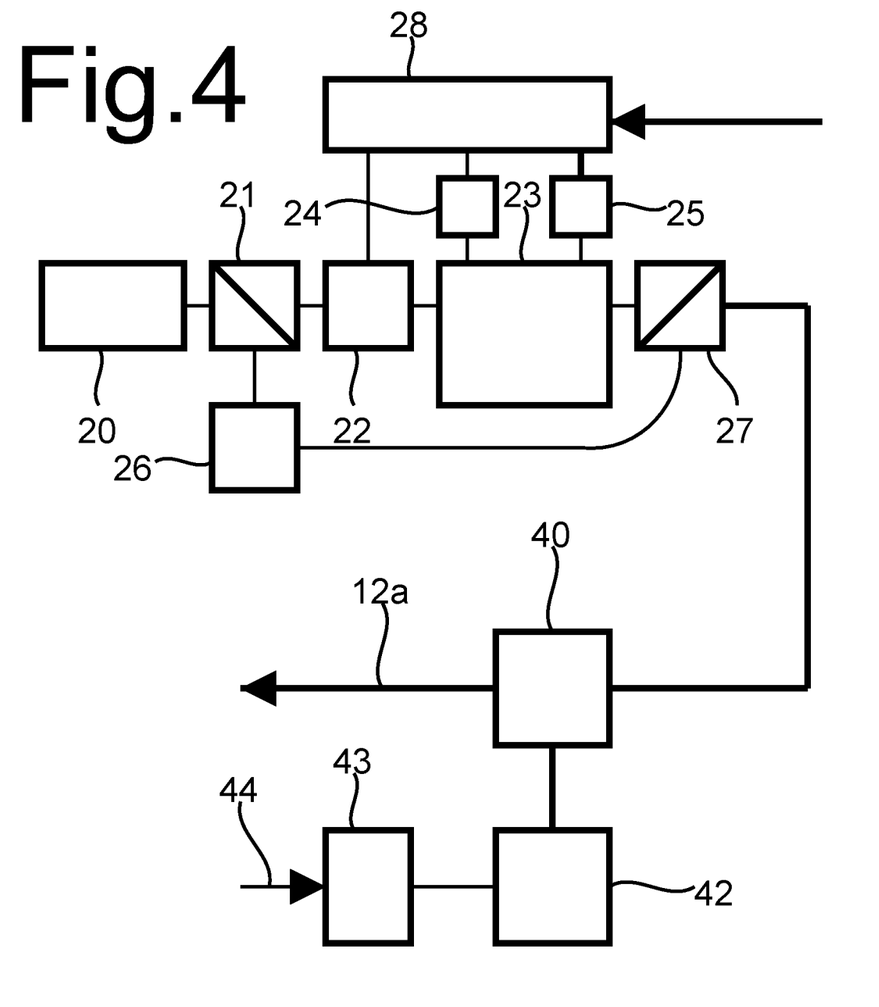
FIG. 4 shows a further embodiment of a detection station and a quantum network node

FIG. 4 shows a quantum network node that provides for wavelength conversion. Compared to the embodiment of FIG. 2, a quantum frequency converter 40 and a further laser 42 have been added. Quantum frequency converter 40 is coupled between optical combiner 27 and optical fiber 12a. Optical fiber 12a is a conventional optical communication fiber with minimum loss at wavelengths in a band between 1260 and 1625 nm. Further laser 42 is coupled to an input of quantum frequency converter 40. Preferably, the difference between the frequency of the light from laser 20 and that of further laser 42 lies in the transmission band of optical fiber 12a, so that simple down conversion can be used. With a wavelength in the optical fiber band of 1260 to 1625 nanometers and a carrier containing an NV center with an emission wavelength of 637 nm, further laser 42 may have a wavelength of 1064 nm, with the emission frequency corresponding to a wavelength of 1588 nm. Quantum frequency converters are known per se. A quantum frequency converter provides for conversion of optical signals at powers down to the single-photon level, translating the wavelength of a quantum state of light while preserving quantum information.

Use of the embodiment of FIG. 4 has the advantage that the photon loss rate in the optical path from the quantum network node to the detection station can be reduced. In this embodiment, the feedback loop in the detection station has the additional advantage that the quantum frequency conversion does not reduce overall stability. The feedback loop in the detection station ensures correction for frequency and phase drift of both laser 20 and further laser 42.

FIG. 4 illustrates an optional further feedback circuit 43 in the quantum network node, with an input 43 for receiving feedback information from the detection station (node shown). The feedback information may be supplied via a further optical fiber (not shown) between the quantum network node and detection station, or via an electronic connection. Further feedback circuit 43 is coupled to further laser 42, for adjusting the wavelength of further laser 42 in response to the feedback information. This makes it possible to reduce the range of feedback that has to be realized by the acoustic optical modulator in the detection station.

Figure 5:
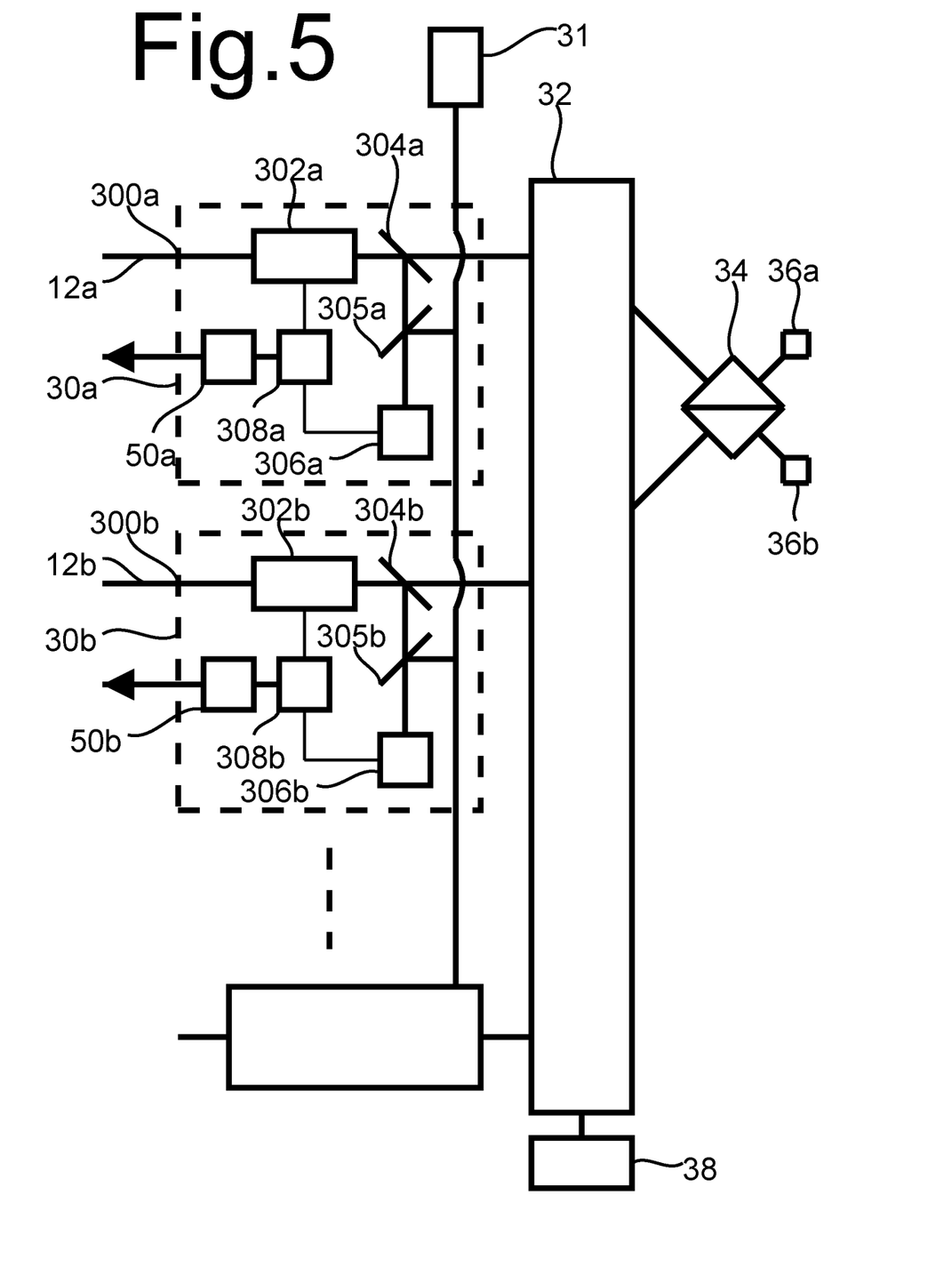
FIG. 5 shows a detection station for use in combination with wavelength conversion

FIG. 5 shows a detection station for use in combination with wavelength conversion. In this embodiment electronic feedback circuit 308a,b is further coupled to communication units 50a,b configured to transmit feedback information to the quantum network nodes that correspond to the units 30a,b. The electronic feedback circuit 308a,b may be configured to do so in order to keep the control signal to acousto-optic modulator 302a,b in its operating range. For example, electronic feedback circuit 308a,b may be configured to cause communication unit 50a,b to transmit a low pass filtered version of the control signal as feedback information to the quantum network node that corresponds to the unit 30a,b. The quantum network node may be configured to adjust the wavelength of further laser 42. Thus, a feedback loop may be formed to regulate the low pass filtered version of the control signal to a predetermined value.

As another example, electronic feedback circuit 308a,b may be configured to test whether the control signal to acousto-optic modulator 302a,b is above a first threshold at the upper end of a predetermined operating range or below a second threshold at the lower end of the predetermined operating range. When the electronic feedback circuit 308a,b of a unit 30a,b detects this, it causes communication unit 50a,b to transmit feedback information to the quantum network node that corresponds to the unit 30a,b. This feedback information may take the form of a command to adjust the wavelength of further laser 42, in a direction that will cause the control signal to move towards the center of the predetermined operating range.

Although embodiments of a quantum network with a detection station containing the feedback loop with acousto-optic modulator 302a,b and separate quantum network has been shown, it should be appreciated that alternatively the detection station may additionally be configured to operate as one of the quantum network nodes. If such a system contains only one further quantum network node, the optical switch could be omitted. Optionally the frequency the light may be shifted before entering optical combiner 27. This reduces optical noise due to double Rayleigh scattering in the time intervals for single photon transmission. It also enables extracting of the phase stabilization light by splitter 304a,b, based on wavelength.

Although embodiments have been shown wherein reference laser 31 is a separate laser that is located at detection station 14, it should be noted that instead the laser 20 of one quantum network nodes 10a,b, or changing ones of the quantum network nodes 10a,b may be used as the reference laser. In that case reference laser 31 need not be present at the location of detection station 14, and the light received from one of the quantum network node 10a,b will be used in the way described for reference laser 31 in the embodiments wherein the reference laser is part of detection station 14.

Summarizing, quantum network nodes use light from a laser to stimulate emission of single photons. A detection station detects arrival of the photons from the quantum network nodes at a photon arrival detector. In time slots between single photon emissions, the quantum network node supply light from the laser to the detection station. The detection station measures a phase differences between light from a reference laser and the light received from different quantum network nodes in said time slots. The detection station has modulators such as optical phase and/or frequency modulators between the optical inputs for light from the quantum network nodes and the photon arrival detector. The detection station uses the measured phase differences in control loops to control the modulator to adjust modulation dependent on the phase difference, so as to establish a predetermined phase relation between the reference laser and the light obtained by modulating the received light from the quantum network nodes in the detection station. The control signal is maintained during the expected time of arrival of photons emitted by the quantum network nodes.

The invention claimed is:

1. A method of operating a photon exchange based quantum network, the network comprising a detection station and a first and second quantum network node, the first and second quantum network node each comprising a laser of the node and a sub-system capable of single photon emission in response to irradiation by a pulse of light from the laser, the detection station comprising a photon arrival detector and a reference laser, the sub-systems of the first and second quantum network nodes being in light communication with the photon arrival detector via respective light transmission paths, the method comprising, in each of the network nodes, the following:

supplying the pulse of light from the laser of the node to the sub-system in the node;

supplying light from the laser of the node into the light transmission path in a time slot preceding a time point at which the network node supplies the pulse of light from the laser of the node; and the method comprising, in the detection station, the following:

using a first and/or second optical phase and/or frequency modulator between the photon arrival detector and the respective light transmission paths, to adapt the optical phase and/or frequency transmission between the respective light transmission paths and the photon arrival detector;

measuring a first and second phase difference between light from the reference laser and light transmitted in said time slot of the first and second network nodes respectively;

applying control signals to the first and second optical phase and/or frequency modulator, and adjusting the control signals dependent on the first and second phase difference respectively, to establish predetermined phase relations between the reference laser and the light in the detection station due to transmission in said time slot from the first and second network nodes, respectively;

maintaining the control signals of the first and second optical phase and/or frequency modulator after the applying and adjusting the control signals, at least until after an expected time of arrival of photons emitted in response to irradiation by a pulse of light in the first and second network nodes.

2. The method according to claim 1, wherein in each of the first and second quantum network nodes light at the frequency of the laser of the node is converted to light at a nominal frequency of the reference laser, using an optical first and second frequency converter in light transmission paths in the first and second network nodes respectively.

3. The method according to claim 1, comprising detecting whether the control signal of the first or second optical phase and/or frequency modulator, or low pass filtered versions of that control signal, is outside a predetermined range and, if so, controlling the optical frequency converter of the corresponding quantum network node to adjust an amount of frequency shift applied by the optical frequency converter, to steer the control signal back into the predetermined range.

4. A detection station for use in a photon exchange based quantum network comprising a plurality of respective quantum network nodes and the detection station, the detection station comprising
a photon arrival detector,
a processing circuit configured to register detections of photon arrivals in an observation time slot;
optical inputs, each for receiving light from one of the respective quantum network nodes;
optical paths between the optical inputs and the photon arrival detector, at least a part of the optical path from each optical input not coinciding with of the optical paths from any other one of the optical inputs;
a reference laser;
and, for each of the optical inputs,
an optical phase and/or frequency modulator in said part of the optical path from the optical input;
an optical phase detector, arranged to measure a phase difference between light from the reference laser and light derived from the optical input;
a control circuit, configured to apply a control signal to the optical phase and/or frequency modulator, and adjust the control signal dependent on the phase difference, so as to establish a predetermined phase relation between the reference laser and the light transmitted in a synchronization time slot that precedes the observation time slot, and to maintain the control signal after said controlling in the synchronization time slot, at least until after an end of the observation time slot.

5. The detection station according to claim 4, wherein the optical phase and/or frequency modulator, the optical phase detector and the control form a feedback loop, the optical phase and/or frequency modulator being located in said part of the optical path from the optical input, the optical phase detector being arranged to measure the phase difference between light from the reference laser and a fraction of light output by the optical phase and/or frequency modulator.

6. The detection station according to claim 4, comprising an optical switch configured to pass light from selectable combinations of the optical inputs towards the photon arrival detector.

7. The detection station according to claim 4, wherein the optical phase and/or frequency modulator is an acousto-optic modulator.

8. The detection station according to claim 4, wherein the phase detector comprises an optical combiner configured to combine light from the reference laser with a fraction of light from said part of the optical path, and a detector configured to detect an intensity of light output by the combiner.

9. The detection station according to claim 4, wherein the processing circuit is configured to register detections of photon arrivals in successive observation time slots including said observation time slot, each detected photon arrival being registered in association with the observation time slot in which the photon arrival was detected; the control circuit being configured to adjust the control signal repeatedly, so as to establish said predetermined phase relation in repeated synchronization time slots between the observation time slots, and to maintain the control signal between the synchronization time slots.

10. A quantum network comprising:
a detection station; and
a plurality of respective quantum network nodes,
wherein the detection station comprises:
a photon arrival detector,
a processing circuit configured to register detections of photon arrivals in an observation time slot;
optical inputs, each optical input being configured to receive light from one of the plurality of respective quantum network nodes;
optical paths between the optical inputs and the photon arrival detector, wherein at least a part of the optical path from each optical input does not coincide with any of the optical paths from any other one of the optical inputs;
a reference laser; and
for each of the optical inputs,
an optical phase and/or frequency modulator in said part of the optical path from the optical input;
an optical phase detector, arranged to measure a phase difference between light from the reference laser and light derived from the optical input;
a control circuit, configured to apply a control signal to the optical phase and/or frequency modulator, and adjust the control signal dependent on the phase difference, so as to establish a predetermined phase relation between the reference laser and the light transmitted in a synchronization time slot that precedes the observation time slot, and to maintain the control signal after said controlling in the synchronization time slot, at least until after an end of the observation time slot and
wherein the plurality of respective quantum network nodes comprise a first quantum network node and a second quantum network node, wherein the first quantum network node and the second quantum network node each comprises:
a laser of the node;
a sub-system capable of single photon emission in response to irradiation by a pulse of light from the laser of the node;
an optical splitter;

an optical pulse modulator configured to receive light from the laser of the node via the optical splitter and to generate and transmit the pulse toward the sub-system;

an optical shutter configured to receive light from the laser via the optical splitter and to pass the light during a time-slot preceding the pulse; and an optical combiner configured to combine light from the sub-system and the optical shutter and transmit the combined light towards one of the optical inputs of the detection station.

11. The quantum network according to claim 10, wherein each of the first and second quantum network node comprises an optical frequency converter coupled between the optical combiner and said one of the optical inputs of the detection station.

12. The quantum network according to claim 11, wherein the optical frequency converter is coupled to said one of the optical inputs of the detection station via an optical communication fiber, the optical frequency converter being configured to convert the frequency of the laser of the node to a frequency of light in a pass band of the optical communication fiber.

13. The quantum network according to claim 11, comprising a feedback circuit configured to detect whether the control signal of one of the optical phase and/or frequency modulators, or a low pass filtered version of that control signal, is outside a predetermined range and, if so, to adjust an amount of frequency shift applied by the optical frequency converter to steer the control signal back into the predetermined range.

14. The quantum network according to claim 11, wherein the first quantum network comprises a further laser coupled to the optical frequency converter, the optical frequency converter being configured to shift the optical frequency by an amount corresponding to the frequency of light from the further laser, the quantum network comprising a feedback loop for controlling the frequency of light from the further laser, based on a detection signal from the optical phase detector of a further detector for detecting a frequency difference between the reference laser and light received from the optical input of the detection station for receiving light from the first quantum network node.

15. The quantum network according to claim 10, wherein the sub-system is one of a nitrogen vacancy center, a cesium or calcium atoms in a cavity or a quantum dot.

* * * * *